(12) United States Patent
Li (10) Patent No.: US 11,637,986 B2
(45) Date of Patent: Apr. 25, 2023

(54) METHOD AND APPARATUS FOR INTERPOLATING FRAME TO VIDEO, AND ELECTRONIC DEVICE

(71) Applicant: BEIJING BAIDU NETCOM SCIENCE AND TECHNOLOGY CO., LTD., Beijing (CN)

(72) Inventor: Chao Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 54 days.

(21) Appl. No.: 17/361,055

(22) Filed: Jun. 28, 2021

(65) Prior Publication Data

US 2021/0329195 A1 Oct. 21, 2021

(30) Foreign Application Priority Data

Dec. 11, 2020 (CN) .......................... 202011460453.4

(51) Int. Cl.
*H04N 7/01* (2006.01)
*G06T 7/246* (2017.01)

(52) U.S. Cl.
CPC ........... *H04N 7/0137* (2013.01); *G06T 7/248* (2017.01); *H04N 7/0127* (2013.01); *G06T 2207/10016* (2013.01); *G06T 2207/20081* (2013.01)

(58) Field of Classification Search
CPC .. H04N 7/0137; H04N 7/0127; H04N 7/0135; G06T 7/248; G06T 2207/10016; G06T 2207/20081; G06T 3/40
See application file for complete search history.

(56) References Cited

U.S. PATENT DOCUMENTS

| 2018/0315174 | A1  | 11/2018 | Staranowicz et al. |
|---|---|---|---|
| 2021/0279840 | A1* | 9/2021 | Chi .......................... G06T 7/251 |
| 2021/0360252 | A1  | 11/2021 | Li et al. |
| 2022/0092795 | A1* | 3/2022 | Liu .......................... G06N 3/084 |

FOREIGN PATENT DOCUMENTS

| CN | 109379550 A | 2/2019 |
|---|---|---|
| CN | 109711316 A | 5/2019 |
| CN | 109756690 A | 5/2019 |
| CN | 110351511 A | 10/2019 |

(Continued)

OTHER PUBLICATIONS

Search Report for EP application 21182152.5 dated Dec. 8, 2021.

(Continued)

*Primary Examiner* — Michael E Teitelbaum
(74) *Attorney, Agent, or Firm* — Maschoff Brennan (57) ABSTRACT

The disclosure provides a method and an apparatus for interpolating a frame to a video. A first deep-level feature of a first frame is obtained and a second deep-level feature of a second frame is obtained. Forward optical flow information and inverse optical flow information between the first frame and the second frame are obtained based on first deep-level feature and the second deep-level feature. An interpolated frame between the first frame and the second frame is generated based on the forward optical flow information and the inverse optical flow information, and the interpolated frame is inserted between the first frame and the second frame.

12 Claims, 8 Drawing Sheets

(56) References Cited

FOREIGN PATENT DOCUMENTS

| CN | 110392282 A | 10/2019 |
| CN | 111654746 A | 9/2020 |
| WO | 2019168765 A1 | 9/2019 |

OTHER PUBLICATIONS

Niklaus et al., "Context-aware Synthesis for Video Frame Interpolation" 2018 IEEE/CVF Conference on Computer Vision and Pattern Recognition, Mar. 29, 2018.
Jiang et al., "Super SloMo:High Quality Estimation of Multiple Intermediate Frames for Video Interpolation" 2018 IEEE/CVF Conference on Computer Vision and Pattern Recognition, Jul. 13, 2018.
CN Office Action in Application No. 202011460453.4 dated Jul. 13, 2022.

* cited by examiner

METHOD AND APPARATUS FOR INTERPOLATING FRAME TO VIDEO, AND ELECTRONIC DEVICE

CROSS REFERENCE TO RELATED APPLICATIONS

This application claims priority and benefits to Chinese Application No. 202011460453.4, filed on Dec. 11, 2020, the entire content of which is incorporated herein by reference.

TECHNICAL FIELD

The disclosure generally relates to a field of image processing technologies, and more particularly to a field of artificial intelligence (AI) technologies such as computer vision and deep learning.

BACKGROUND

With booming of mobile Internet, a way that users store and forward information has gradually been transitioned from text and pictures to videos. Video has become a major carrier of contents generated by the users. At present, there is a huge gap on experience between videos with a frame rate of 24-30 fps and videos with a high frame rate of 60 or 120 fps. As a result, a technology for frame interpolation to video has emerged.

SUMMARY

A method for interpolating a frame to a video is provided here. In one embodiment, a first deep-level feature of a first frame is obtained and a second deep-level feature of a second frame is obtained. The first frame and the second frame are adjacent frames of a video. Forward optical flow information and inverse optical flow information between the first frame and the second frame are obtained based on the first deep-level feature and the second deep-level feature. An interpolated frame between the first frame and the second frame is generated based on the forward optical flow information and the inverse optical flow information and the interpolated frame is inserted between the first frame and the second frame.

An electronic device is provided here. In one embodiment, the electronic device includes at least one processor and a memory communicatively coupled to at least one processor. The memory is configured to store instructions executable by the at least one processor. When the instructions are executed by the at least one processor, the at least one processor is configured to execute a method for interpolating a frame to a video described above.

A non-transitory computer-readable storage medium having computer instructions stored thereon is provided here. In one embodiment, when the computer instructions are configured to cause a computer to execute a method for interpolating a frame to a video described above.

It is to be understood that, the content described in the part is not intended to recognize key or important features of embodiments of the disclosure, nor intended to limit the scope of the disclosure. Other features of the disclosure will be easy to understand through the following specification.

BRIEF DESCRIPTION OF THE DRAWINGS

The drawings are intended to well understand the solution of the disclosure, and do not constitute a limitation to the disclosure.

DETAILED DESCRIPTION

Exemplary embodiments of the disclosure will be described as below with reference to the accompanying drawings, including various details of embodiments of the disclosure to facilitate understanding, and should be considered as merely exemplary. Therefore, those skilled in the art should realize that various changes and modifications may be made to the embodiments described herein without departing from the scope and spirit of the disclosure. Similarly, for clarity and conciseness, descriptions of well-known functions and structures are omitted in the following descriptions.

At present, there is a huge gap on experience between videos with a frame rate of 24-30 fps and videos with a high frame rate of 60 or 120 fps. As a result, a technology for frame interpolation to video has emerged. With the technology for frame interpolation to video, the frame rate of the video can increase by interpolating intermediate frames between video frames of the video to allow the video smooth for watching, reduce content skipping, jitter. Therefore, user experience may be greatly enhanced.

However, the method for frame interpolation to video often relies on manual labelling while interpolating frames. In this case, poor effect and low efficiency of frame interpolation may be caused by low computational efficiency and serious picture deformation during a process of performing the frame interpolation on the video.

Therefore, the disclosure provides a method and an apparatus for interpolating a frame to a video.

The following is a brief description on technical fields related to the technical solution of the disclosure.

Image processing is a technology that a computer analyzes an image to achieve desired results, which is also referred to as photo processing. The image processing generally refers to processing a digital image. The digital image refers to a large two-dimensional array obtained from a device such as an industrial camera, a video camera, a scanner, where elements of the array are referred to as pixels and its value is referred to as gray value. The image processing technology generally includes three parts, i.e., image compression, image enhancement and restoration, and image matching, description and recognition.

Artificial intelligence (AI) is a subject of studying how to allow a computer to simulate thinking processes and intelligent behaviors (such as learning, reasoning, thinking, planning) of human beings, which covers hardware-level technologies and software-level technologies. Software-level technologies of AI generally include computer vision technology, speech recognition technology, natural language processing technology and its learning/deep learning (DL), big data processing technology, knowledge graph technology, etc.

DL is a new research direction in a field of Machine Learning (ML), which is introduced into the ML to get closer to its original goal, i.e., artificial intelligence. The DL is to learn inherent regular and representation hierarchy of sample data, and information obtained in the learning process helps interpretation of data such as words, images and sound. A final goal of the DL is to make the machine to have analytic learning ability like human beings to recognize data such as words, images, and sound. The DL is a complicated machine learning algorithm, which has far outperformed the related art in speech and image recognition.

Computer vision is a science of studying how to make a machine to "look". Further, the computer vision means that a camera and a computer replace human eyes to perform machine vision such as recognition, tracking, and measurement on an object, and the computer performs graphics processing on an image to make the processed image suitable for human eyes or transmitting to the instrument for detection. As a science subject, the computer vision attempts to establish an artificial intelligence system that may obtain "information" from the image or multi-dimensional data by studying related theory and techniques. The "information" herein refers to information defined by Shannon that helps to make a "decision". Since perception may be deemed to extract information from sensory signals, the computer vision can be deemed as a science that studies how the AI system "perceives" from the image or the multi-dimensional data.

A method and an apparatus for interpolating a frame to a video and an electronic device will be described in combination with drawings of the disclosure below.

Figure 1:
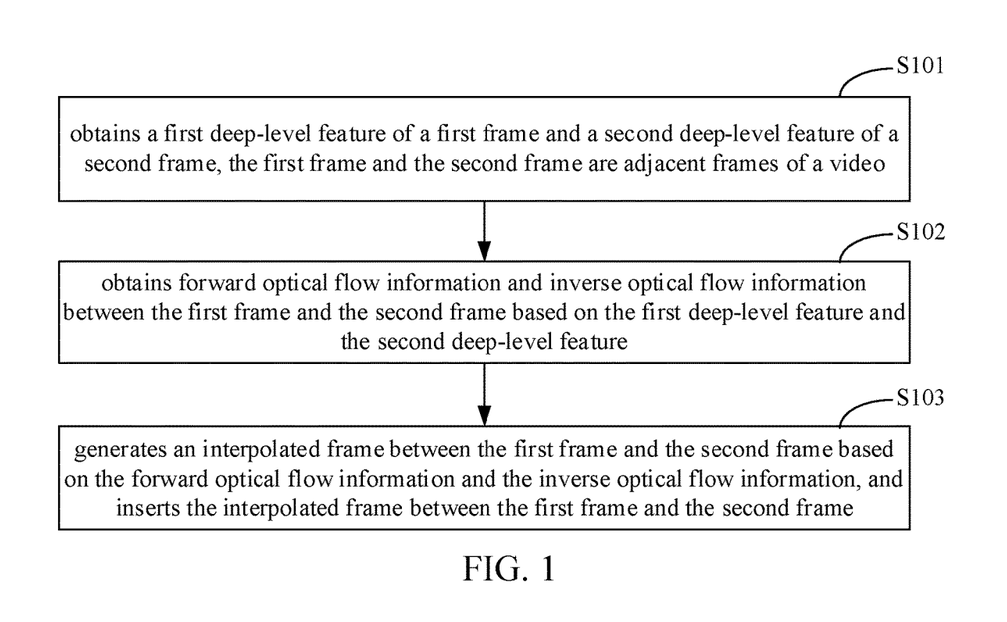
FIG. 1 is a schematic diagram illustrating a method for interpolating a frame to a video according to embodiments of the disclosure.

FIG. 1 is a schematic diagram illustrating a method for interpolating a frame to a video according to embodiments of the disclosure. It is to be noted that, the method for interpolating a frame to a video according to embodiments of the disclosure may be executed by an apparatus for interpolating a frame to a video according to embodiments of the disclosure. The apparatus can be integrated into an electronic device. As illustrated in FIG. 1, the method may include the following.

At S101, a first deep-level feature of a first frame and a second deep-level feature of a second frame are obtained. The first frame and the second frame are adjacent frames of a video.

The deep-level features of the first frame and the second frame of the video may be extracted to perform the frame interpolated.

For example, the deep-level feature of a $t^{th}$ frame of a video is extracted and the deep-level feature of a $(t+1)^{th}$ frame of the video is extracted to perform the frame interpolated.

The video may include multiple frames, where a frame is an image consisting the video. The frame or the image is also called as single-frame image. The video may be determined by a user to perform the frame interpolation to increase the playback fluency.

The video may be obtained through an electronic device. In an example, when the electronic device is a video providing device, the electronic device may obtain the video from its own storage area. In another example, when the electronic device is a display device, the electronic device may obtain the video from a video providing device. For example, the electronic device may download the video from the video providing device based on a uniform resource locator (URL) corresponding to the video. In still another example, when the electronic device is the display device, the electronic device may having videos stored thereon, and the electronic device may obtain the video from its own storage area. In yet still another example, when the electronic device is the display device, the electronic device may obtain the video by shooting the video via a built-in camera.

After the video is obtained, any two adjacent frames of the video may be obtained by executing a preset application. That is, the first frame and the second frame are obtained.

The deep-level feature, different from a shallow-level feature, is a feature to which the level having deeper network depth in the field of the DL corresponds. In general, features extracted from a back end of the network are the deep-level features. The deep-level feature has strong semantic information.

It is to be noted that, the way of obtaining the first deep-level feature and the second deep-level feature is not limited, which may be selected according to the actual situation.

In some examples, after the video, the first frame and the second frame are obtained, shallow-level features may be obtained correspondingly. The shallow-level features can be enhanced based on a convolutional neural network (CNN) to obtain the first deep-level feature and the second deep-level feature.

At S102, forward optical flow information and inverse optical flow information between the first frame and the second frame are obtained based on the first deep-level feature and the second deep-level feature.

It is to be noted that, in related arts, the frame interpolation to video is often performed through a naive optical flow network of explicit optical flow information based on manually labelling. In this case, manually labelling the optical flow data is costly, and time consumption is very heavy. As a result, poor effect, low efficiency, high cost, and high time consumption will be caused on the frame interpolation. In view of the above, in the disclosure, optical flow learning may be performed based on the first deep-level feature and the second deep-level feature to obtain forward optical flow information and inverse optical flow information, to achieve the frame interpolation to video. The forward optical flow information and the inverse optical flow information may be also called forward implicit optical flow information and the inverse implicit optical flow information, compared with the explicit optical flow information based on manually labelling.

The optical flow learning refers to a method for calculating motion information of an object between adjacent frames by finding a correspondence between a current frame and a previous frame based on changes in the time domain of pixels contained in the image sequence and a correlation between adjacent frames.

It is to be noted that, a way of obtaining the forward optical flow information and the inverse optical flow information between the first frame and the second frame is not limited in the disclosure, which may be selected according to the actual situation. For example, the forward optical flow information between the first frame and the second frame can be obtained according to a chronological order of frames and based on the first deep-level feature and the second deep-level feature. The inverse optical flow information between the first frame and the second frame can be obtained according to a reverse chronological order of frames and based on the first deep-level feature and the second deep-level feature.

At S103, an interpolated frame between the first frame and the second frame is generated based on based on the forward optical flow information and the inverse optical flow information, and the interpolated frame is inserted between the first frame and the second frame.

It is to be noted that, a way of generating the interpolated frame between the first frame and the second frame based on the forward optical flow information and the inverse optical flow information is not limited in the disclosure, which may be selected according to the actual situation. For example, the forward optical flow information and the inverse optical flow information can be spliced and integrated together in a dimension of channel and the spliced information is input to a preset frame interpolation network to generate the interpolated frame. The preset frame interpolation network can be calibrated based on actual conditions. For example, the preset frame interpolation network may include deep convolutional networks, which is not limited here.

With the method for interpolating a frame to a video according to embodiments of the disclosure, the first deep-level feature of the first frame and the second deep-level feature of the second frame are obtained, the forward optical flow information and the inverse optical flow information between the first frame and the second frame are obtained based on the first deep-level feature and the second deep-level feature, the interpolated frame between the first frame and the second frame is generated based on the forward optical flow information and the inverse optical flow information, and the interpolated frame is inserted between the first frame and the second frame. Therefore, the disclosure does not rely on the explicit optical flow information based on manually labelling to perform the frame interpolation to video, makes full use of the optical flow information of the video, reduces jitter, blurring and deformation of video pictures, saves cost, shortens time consumption, improves efficiency of frame interpolation to video, and enhances effect of the frame interpolation. Further, after getting rid of the reliance on the explicit optical flow information, fined optimization on different types of videos may be realized.

It is to be noted that, in the disclosure, for obtaining the forward optical flow information and the inverse optical flow information between the first frame and the second frame based on the first deep-level feature and the second deep-level feature, the optical flow learning may be performed to obtain the forward optical flow information and the inverse optical flow information between the first frame and the second frame.

Figure 2:
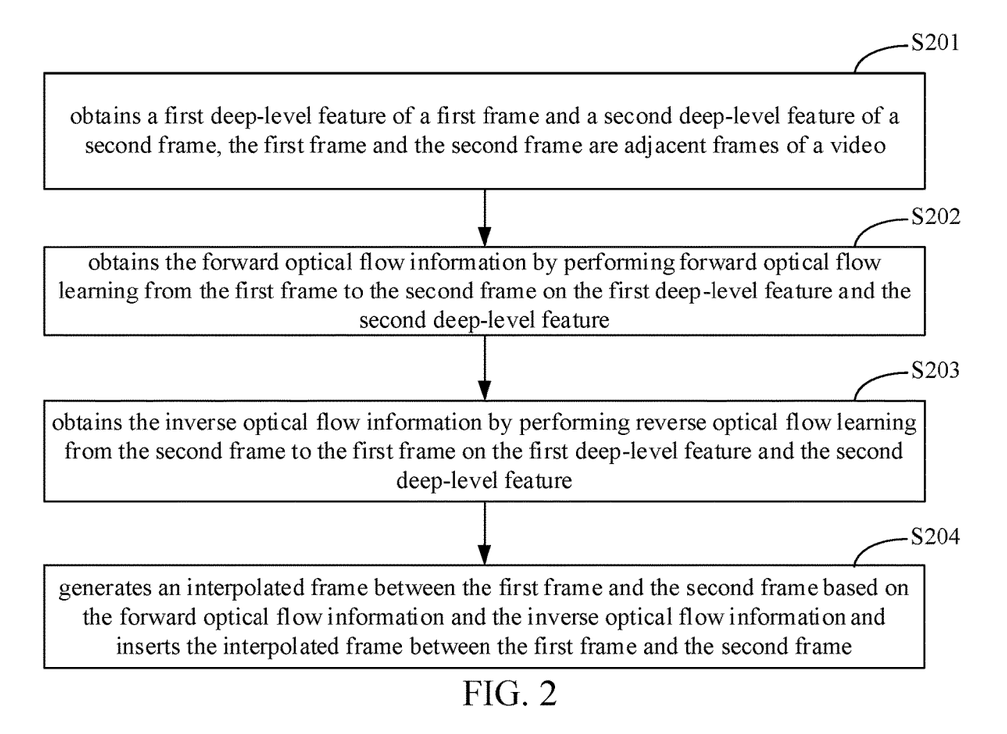
FIG. 2 is a schematic diagram illustrating a method for interpolating a frame to a video according to embodiments of the disclosure.

FIG. 2 is a schematic diagram illustrating a method for interpolating a frame to a video according to embodiments of the disclosure. As illustrated in FIG. 2, on the basis of the above embodiments, the method may include the following.

At S201, a first deep-level feature of a first frame is obtained and a second deep-level feature of a second frame is obtained. The first frame and the second frame are adjacent frames of a video.

The block S201 is the same with the above block S101, which will be not repeated here.

The block S102 in the above embodiment may include blocks S202 and S203.

At S202, forward optical flow information is obtained by performing forward optical flow learning from the first frame to the second frame based on the first deep-level feature and the second deep-level feature.

At S203, inverse optical flow information is obtained by performing inverse optical flow learning from the second frame to the first frame based on the first deep-level feature and the second deep-level feature.

The first deep-level feature and the second deep-level feature can be spliced to generate a third deep-level feature. The forward optical flow learning and the inverse optical flow learning are performed respectively on the third deep-level feature, to obtain the forward optical flow information and the inverse optical flow information between the first frame and the second frame. The third deep-level feature is used for performing the forward optical flow learning and the inverse optical flow learning.

For example, for the first frame and the second frame, the first deep-level feature and the second deep-level feature can be spliced to generate the third deep-level feature. Further, the optical flow learning may be performed on the third deep-level feature according to the chronological order of frames, to obtain the forward optical flow information $f_{1\rightarrow 2}$ between the first frame and the second frame, where $f_{1\rightarrow 2}$ represents the forward optical flow information between the first frame and the second frame. In addition, the optical flow learning is performed on the third deep-level feature according to a reverse chronological order of frames to obtain the inverse optical flow information $f_{2\rightarrow 1}$ between the first frame and the second frame, where $f_{2\rightarrow 1}$ represents the inverse optical flow information between the first frame and the second frame.

At S204, an interpolated frame between the first frame and the second frame is generated based on the forward optical flow information and the inverse optical flow information, and the interpolated frame is inserted between the first frame and the second frame.

The block S204 is the same with the above block S103, which will be not repeated here.

With the method for interpolating a frame to a video according to embodiments of the disclosure, the forward optical flow learning from the first frame to the second frame is performed on the first deep-level feature and the second deep-level feature to obtain the forward optical flow information, and the inverse optical flow learning from the second frame to the first frame is performed on the first deep-level feature and the second deep-level feature to obtain the inverse optical flow information. The forward optical flow information and the inverse optical flow information are spliced to generate third vision semantic feature and third pixel information. That is, through the optical flow learning, the semantic optical flow information and the pixel optical flow information are generated. Therefore, after getting rid of the dependence on explicit optical flow information, defined optimization on different types of videos may be realized.

It is to be noted that, in the disclosure, for generating the interpolated frame between the first frame and the second frame based on the forward optical flow information and the inverse optical flow information, the interpolated frame may be generated by mapping or frame generation.

Figure 3:
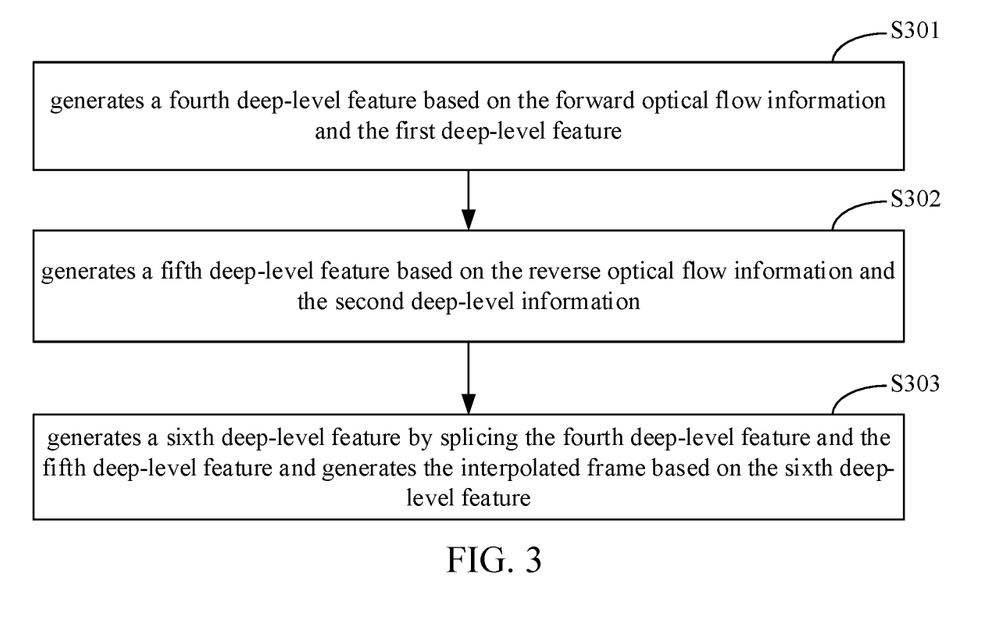
FIG. 3 is a schematic diagram illustrating a method for interpolating a frame to a video according to embodiments of the disclosure.

FIG. 3 is a schematic diagram illustrating a method for interpolating a frame to a video according to embodiments of the disclosure. As illustrated in FIG. 3, on the basis of the above embodiment, the method may include the following.

At S301, a fourth deep-level feature is generated based on the forward optical flow information and the first deep-level feature.

The fourth deep-level feature is generated by performing track mapping on feature information of the first deep-level feature based on the forward optical flow information.

The track mapping refers to a mapping between corresponding motion processes based on the feature information.

The feature information of the first deep-level feature is mapped to the interpolated frame based on the forward optical flow information to generate the fourth deep-level feature. The fourth deep-level feature corresponds to the deep-level feature of the interpolated frame.

At S302, a fifth deep-level feature is generated based on the inverse optical flow information and the second deep-level information.

The fifth deep-level information can be generated by performing the track mapping on the feature information of the second deep-level feature based on the inverse optical flow information.

The feature information of the second deep-level feature may be mapped to the interpolated frame based on the inverse optical flow information to generate the fifth deep-level feature. The fifth deep-level feature corresponds to the deep-level feature of the interpolated frame.

At S303, the fourth deep-level feature and the fifth deep-level feature are spliced to generate a sixth deep-level feature, and the interpolated frame is generated based on the sixth deep-level feature.

It is to be noted that, the interpolated frame can be generated through a frame interpolation and generation model based on the sixth deep-level feature. The frame interpolation and generation model may include multiple networks.

Figure 4:
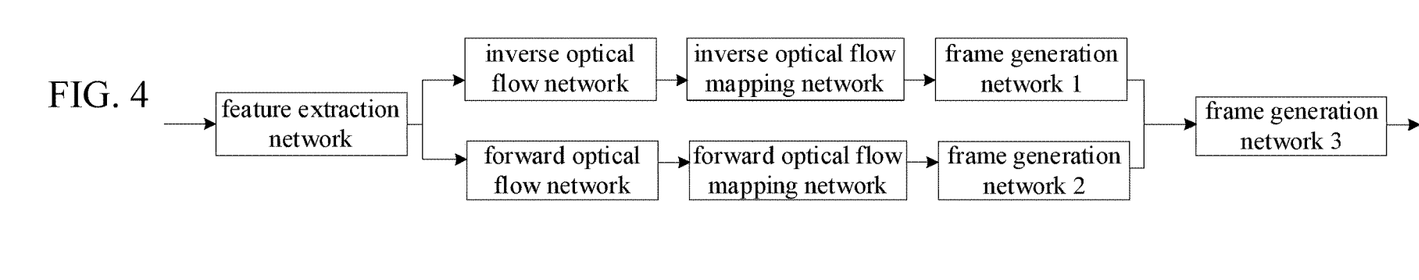
FIG. 4 is a schematic diagram illustrating a frame interpolation and generation model.

For example, as illustrated in FIG. 4, the frame interpolation and generation model may include a feature extraction network, a forward optical flow network, an inverse optical flow network, a forward optical flow mapping network, an inverse optical flow mapping network and a frame generation network.

The feature extraction network may extract deep-level features of video frames. Spatial down sampling may be adopted to extract the deep-level features, to reduce computational complexity.

The forward optical flow network may perform forward optical flow learning based on the deep-level features of a $(t-1)^{th}$ frame and a $(t+1)^{th}$ frame, to obtain the forward optical flow information from the time corresponding to the $(t-1)^{th}$ frame to the time corresponding to the $(t+1)^{th}$ frame.

The inverse optical flow network may perform the inverse optical flow learning based on the deep-level features of the $(t-1)^{th}$ frame and the $(t+1)^{th}$ frame, to obtain the inverse optical flow information from the time corresponding to the $(t+1)^{th}$ frame to the time corresponding to the $(t-1)^{th}$ frame.

It is to be noted that the inputs of the forward optical flow network and the inverse optical flow network are the same, both of which are the deep-level features of the $(t-1)^{th}$ frame and the $(t+1)^{th}$ frame.

The forward optical flow mapping network may perform the mapping operation based on the forward optical flow information from the time corresponding to the $(t-1)^{th}$ frame to the time corresponding to the $(t+1)^{th}$ frame. That is, the forward optical flow mapping network may map the deep-level feature of the $(t-1)^{th}$ frame to the $(t+1)^{th}$ frame to obtain the deep-level feature $(t+1)'$ of the time corresponding to the $(t+1)^{th}$ frame.

The inverse optical flow mapping network may perform the mapping operation based on the inverse optical flow information from the time corresponding to the $(t+1)^{th}$ frame to the time corresponding to the $(t-1)^{th}$ frame. That is, the inverse optical flow mapping network can map the deep-level feature of the $(t+1)^{th}$ frame to the $(t-1)^{th}$ frame to obtain the deep-level feature $(t-1)'$ of the time corresponding to the $(t-1)^{th}$ frame.

The frame generation network, such as the frame generation networks 1 to 3, may generate a $t^{th}$ frame based on the features $(t-1)'$ and $(t+1)'$ generated by the forward and inverse optical flow mapping networks. The $t^{th}$ frame is the final interpolated frame.

To enhance the accuracy of the frame interpolation to video and to further improve the effect of the frame interpolation to video, and to make the video subjected to the frame interpolation smooth, information of the interpolated frame is generated by the frame interpolation model. The frame interpolation model may be obtained through training, which is not limited here.

Training and generating the frame interpolation model may be performed by a relevant server. The server may be a cloud server, or a host of a computer. There is a communication connection between the server and the electronic device for implementing the method for interpolating a frame to a video according to embodiments of the disclosure. The communication connection may be at least one of wireless network connection and wired network connection. The server may send a trained frame interpolation model to the electronic device, such that the electronic device can call the trained frame interpolation model when needed to reduce computing pressure of the electronic device. In addition, the task of the frame interpolation to video is assisted by the frame interpolation model, to improve the accuracy of the frame interpolation to video.

Figure 5:
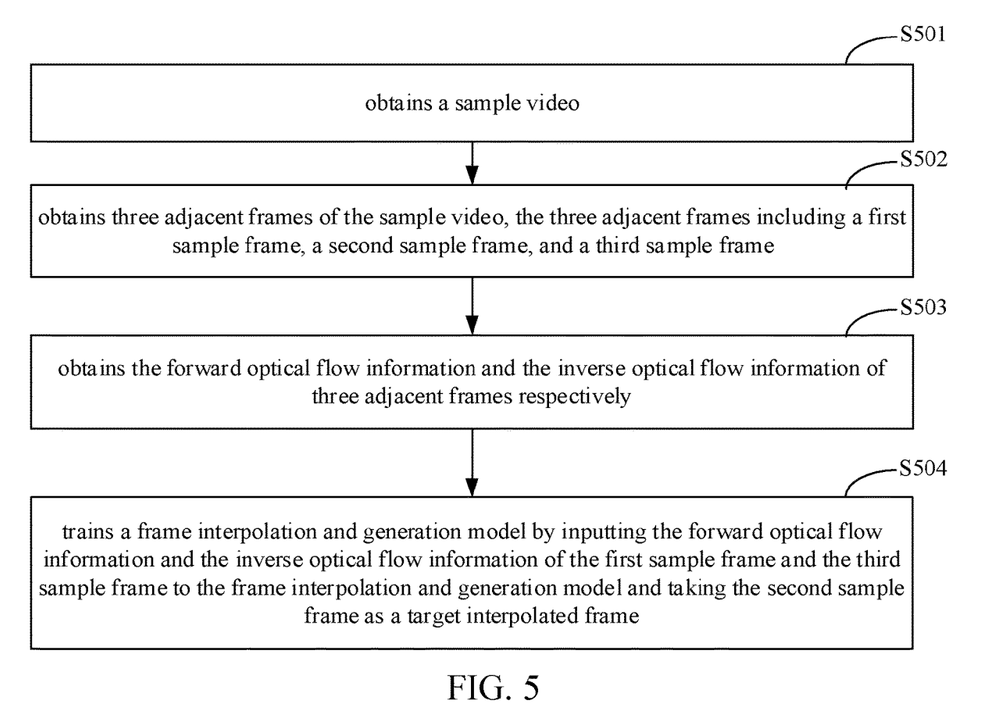
FIG. 5 is a schematic diagram illustrating a method for interpolating a frame to a video according to embodiments of the disclosure.

In detail, as illustrated in FIG. 5, the frame interpolation model may be generated as follows.

At block 501, a sample video is obtained.

In an example, the server may obtain the sample video. In another example, the sample video may be a professional training video provided by an engineer, or may be a training video used for a target video that needs to perform the frame interpolation, such that the trained frame interpolation model may well assist the task of the frame interpolation.

At block 502, three adjacent frames of the sample video are obtained. The three adjacent frames include a first sample frame, a second sample frame, and a third sample frame.

The server may obtain the $(t-1)^{th}$ frame, the $t^{th}$ frame, and the $(t+1)^{th}$ frame of the sample video, where t is a positive integer.

At block 503, the forward optical flow information and the inverse optical flow information of three adjacent frames are obtained respectively.

The server may obtain the forward optical flow information and the inverse optical flow information of the $(t-1)^{th}$ frame, the $t^{th}$ frame, and the $(t+1)^{th}$ frame respectively.

At block 504, the frame interpolation and generation model is trained by inputting the forward optical flow information and the inverse optical flow information of the first sample frame and the third sample frame to the frame interpolation and generation model, and taking the second sample frame as a target interpolated frame.

The server may input the forward optical flow information and the inverse optical flow information of the $(t-1)^{th}$ frame and the $(t+1)^{th}$ frame to the frame interpolation model and take the $t^{th}$ frame as the target interpolated frame to train the frame interpolation model.

The training process of the frame interpolation model will be described in detail below in combination with FIG. 6.

Figure 6:
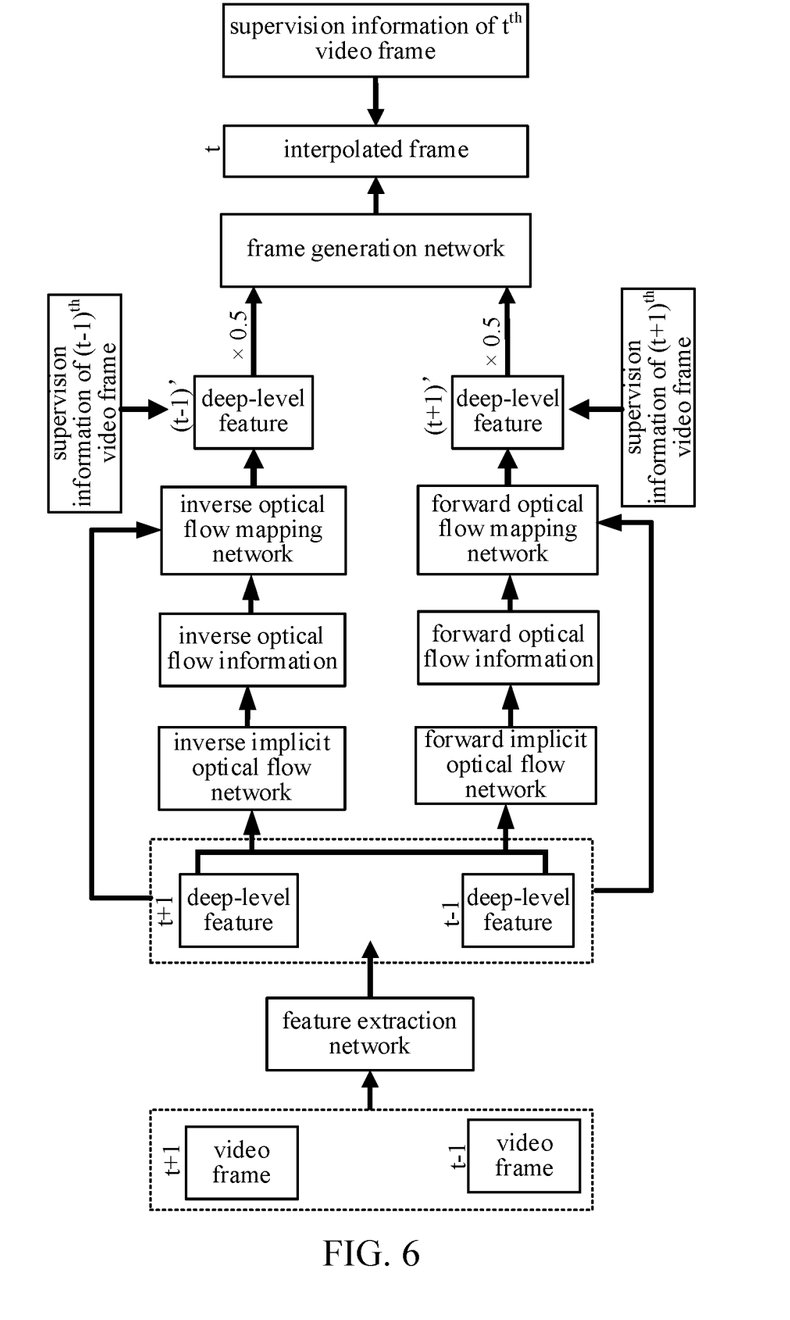
FIG. 6 is a schematic diagram illustrating a training process of a frame interpolation and generation model.

As illustrated in FIG. 6, the server obtains the sample video and obtains the three adjacent frames of the target video, i.e., the $(t-1)^{th}$ frame, the $t^{th}$ frame, and the $(t+1)^{th}$ frame. The server obtains the deep-level features of the $(t-1)^{th}$ frame, the $t^{th}$ frame, and the $(t+1)^{th}$ frame through a feature extraction network used for training and obtains the forward optical flow information and the inverse optical flow information of $(t-1)^{th}$ frame, the $t^{th}$ frame, and the $(t+1)^{th}$ frame respectively through the forward optical flow network used for training and the inverse optical flow network used for training. A video frame supervision program is installed in the server, to supervise the video frame information of $(t-1)^{th}$ frame, the $t^{th}$ frame, and the $(t+1)^{th}$ frame to ensure the accuracy of the deep-level features.

Further, the server inputs the forward optical flow information and the inverse optical flow information of the $(t-1)^{th}$ frame and the $(t+1)^{th}$ frame to the forward optical flow mapping network and the inverse optical flow mapping network to obtain deep-level features.

Further, the server inputs the obtained deep-level features to the frame generation network to obtain the interpolated frame t of the video. Meanwhile, the video frame supervision program installed in the server supervises the interpolated frame t of the video to ensure the accuracy of the interpolated frame t of the video.

Thus, the server inputs the $(t-1)^{th}$ frame and the $(t+1)^{th}$ frame to the frame interpolation model and takes the $t^{th}$ frame as a target interpolated frame to train the frame interpolation model. For example, the forward optical flow information and the inverse optical flow information of the $(t-1)^{th}$ frame and the $(t+1)^{th}$ frame are compared with the forward optical flow information and the inverse optical flow information of the $t^{th}$ frame respectively to determine a displacement change of each object and a scenario change between a previous frame and a latter frame of the $t^{th}$ frame. The displacement change and the scenario change are used as the training data to train the frame interpolation model, to improve the training effect.

It is to be noted that the method for interpolating a frame to a video according to the disclosure may be applied to various scenarios.

For an application scenario of de-watermarking for a video, two adjacent frames of the video to be processed (the video to be processed is selected by a user and is subjected to the de-watermarking) may be taken as the first frame and the second frame. In some examples, in order to shorten the time consumption of the de-watermarking process, the video to be processed may be pre-processed to determine a video segmentation of the video having watermarks as the target video. Further, two adjacent frames of the target video may be taken as the first frame and the second frame.

The first deep-level feature of the first frame and the second deep-level feature of the second frame may be obtained based on AI technologies such as computer vision and deep learning. The forward optical flow information and the inverse optical flow information between the first frame and the second frame are obtained based on the first deep-level feature and the second deep-level feature. The interpolated frame between the first frame and the second frame is obtained based on the forward optical flow information and the inverse optical flow information. The interpolated frame is inserted between the first frame and the second frame. Therefore, the watermarks may be rapidly and accurately removed, cost may be saved, jitter, blurring and deformation of pictures of the video can be reduced, and the user experience can be enhanced.

With the method for interpolating a frame to a video according to embodiments of the disclosure, the frame interpolation to video does not rely on explicit optical flow information based on manually labelling. By making full use of the optical flow information in the video, jitter, blurring and deformation of pictures of the video can be reduced, cost can be saved, time consumption can be shortened, the efficiency of the frame interpolation to video can be improved, and the effect of the frame interpolation to video can be enhanced. Further, after getting rid of the dependence on explicit optical flow information, fined optimization of different types of videos may be realized. Further, uniform supervision training is performed on the scenario of frame interpolation to video to improve the effect of the frame interpolation.

Corresponding to the method for interpolating a frame to a video according to above embodiments, the disclosure further provides an apparatus for interpolating a frame to a video. Since the apparatus for interpolating a frame to a video according to embodiments of the disclosure corresponds to the method for interpolating a frame to a video according to embodiments of the disclosure, the implementation of the method for interpolating a frame to a video can also be applied to the apparatus for interpolating a frame to a video according to embodiments of the disclosure, which will be not described herein.

Figure 7:
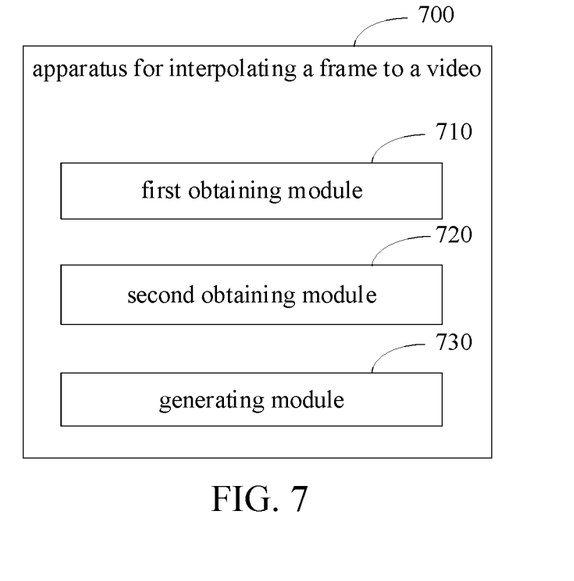
FIG. 7 is a block diagram illustrating an apparatus for interpolating a frame to a video according to embodiments of the disclosure.

FIG. 7 is a schematic diagram illustrating an apparatus for interpolating a frame to a video according to embodiments of the disclosure.

As illustrated in FIG. 7, the apparatus 700 for interpolating a frame to a video may include a first obtaining module 710, a second obtaining module 720 and a generating module 730.

The first obtaining module 710 is configured to obtain a first deep-level feature of a first frame and a second deep-level feature of a second frame. The first frame and the second frame are adjacent frames of a video.

The second obtaining module 702 is configured to obtain forward optical flow information and inverse optical flow information between the first frame and the second frame based on the first deep-level feature and the second deep-level feature.

The generating module 730 is configured to generate an interpolated frame between the first frame and the second frame based on the forward optical flow information and the inverse optical flow information and insert the interpolated frame between the first frame and the second frame.

Figure 8:
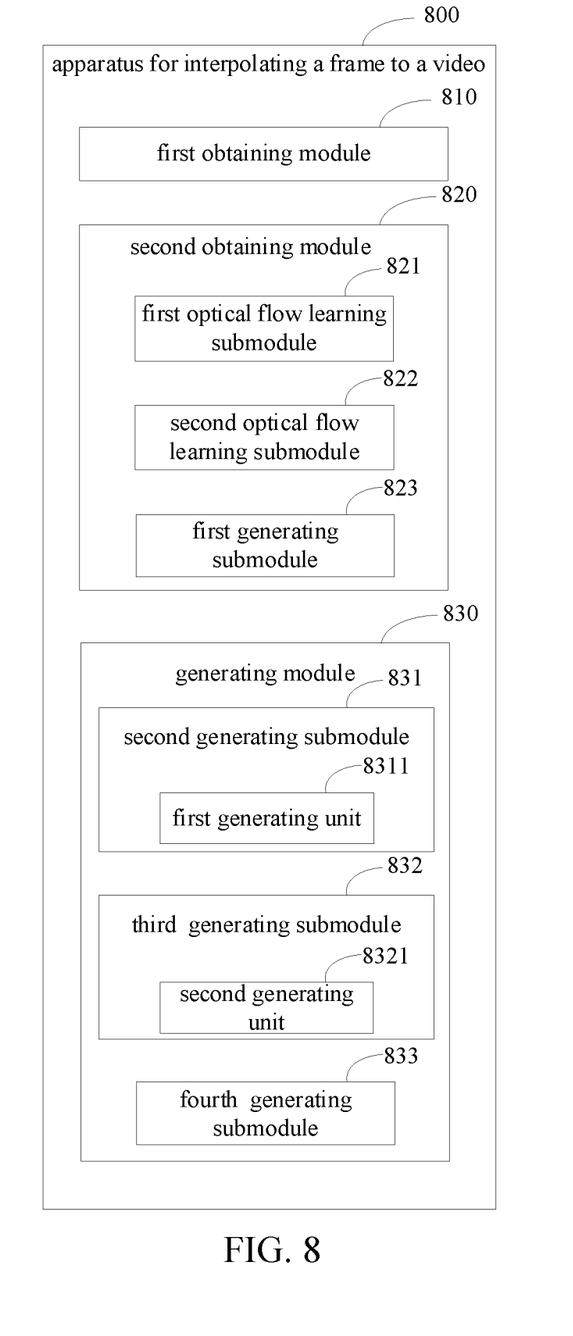
FIG. 8 is a block diagram illustrating block diagram illustrating an apparatus for interpolating a frame to a video according to embodiments of the disclosure.

FIG. 8 is a schematic diagram illustrating an apparatus for interpolating a frame to a video according to embodiments of the disclosure.

As illustrated in FIG. 8, the apparatus 800 for interpolating a frame to a video may include a first obtaining module 810, a second obtaining module 820 and a generating module 830.

The second obtaining module 820 includes: a first optical flow learning submodule 821, a second optical flow learning submodule 822, and a first generating submodule 823.

The first optical flow learning submodule 821 is configured to perform generate the forward optical flow information by performing forward optical flow learning from the first image to the second image on the first deep-level feature and the second deep-level feature.

The second optical flow learning submodule 822 is configured to obtain the inverse optical flow information by performing inverse optical flow learning from the second frame to the first frame on the first deep-level feature and the second deep-level feature.

The first generating submodule 823 is configured to generate a third deep-level feature by splicing the first deep-level feature and the second deep-level feature. The third deep-level feature is used for performing the forward optical flow learning and the inverse optical flow learning.

The generating module 830 includes a second generating submodule 831, a third generating submodule 832, and a fourth generating submodule 833.

The second generating submodule 831 is configured to generate a fourth deep-level feature based on the forward optical flow information and the first deep-level feature.

The third generating submodule 832 is configured to generate a fifth deep-level feature based on the inverse optical flow information and the second deep-level feature.

The fourth generating submodule 833 is configured to a sixth deep-level feature by splicing the fourth deep-level feature and the fifth deep-level feature and generate an interpolated frame based on the sixth deep-level feature.

The second generating submodule 831 includes a first generating unit 8311.

The first generating unit 8311 is configured to generate the fourth deep-level feature by performing track mapping on feature information of the first deep-level feature based on the forward optical flow information.

The third generating submodule 832 includes a second generating unit 8321.

The second generating unit 8321 is configured to obtain the fifth deep-level feature by performing track mapping on feature information of the second deep-level feature based on the inverse optical flow information.

It is to be noted that, the obtaining module 810 has the same function and structure with the obtaining module 710.

With the apparatus for interpolating a frame to a video according to embodiments of the disclosure, the frame interpolation to video does not rely on explicit optical flow information based on manually labelling. By making full use of the optical flow information in the video, jitter, blurring and deformation of pictures of the video can be reduced, cost can be saved, time consumption can be shortened, the efficiency of the frame interpolation to video can be improved, and the effect of the frame interpolation to video can be enhanced. Further, after getting rid of the dependence on explicit optical flow information, fined optimization of different types of videos may be realized. Further, uniform supervision training is performed in the scenario of the frame interpolation to video to improve the effect of the frame interpolation.

An electronic device and a readable storage medium are further provided in the disclosure.

Figure 9:
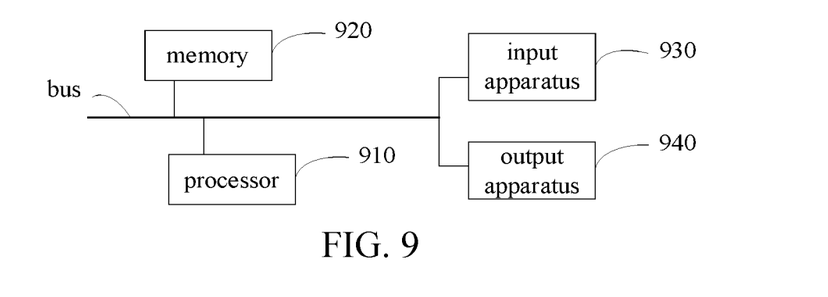
FIG. 9 is a block diagram illustrating an electronic device for implementing a method for interpolating a frame to a video according to embodiments of the disclosure.

FIG. 9 is a block diagram illustrating an electronic device for implementing a method for interpolating a frame to a video according to embodiments of the disclosure. The electronic device is intended to represent various types of digital computers, such as laptop computers, desktop computers, workstations, personal digital assistants, servers, blade servers, mainframe computers, and other suitable computers. The electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 9, the electronic device includes: one or more processors 910, a memory 920, and an interface configured to connect various components, including a high-speed interface and a low-speed interface. The various components are connected to each other with different buses, and may be installed on a public main board or installed in other ways as needed. The processor may process instructions executed in the electronic device, including instructions stored in or on the memory to display graphical information of the GUI on an external input/output device (such as a display device coupled to an interface). In other implementation, a plurality of processors and/or a plurality of buses may be configured with a plurality of memories if necessary. Similarly, the processor may connect a plurality of electronic devices, and each device provides a part of necessary operations (for example, as a server array, a group of blade servers, or a multi-processor system). FIG. 9 takes one processor 910 as an example.

A memory 920 is a non-transitory computer-readable storage medium according to embodiments of the disclosure. The memory stores instructions executable by the at least one processor, so that the at least one processor executes a method for interpolating a frame to a video according to embodiments of the disclosure. The non-transitory computer-readable storage medium of the disclosure stores computer instructions, in which the computer instructions are configured so that a method for interpolating a frame to a video according to embodiments of the disclosure.

As a non-transitory computer-readable storage medium, the memory 920 may be configured to store non-transitory software programs, non-transitory computer-executable programs and modules, such as program instructions/modules corresponding to a method for interpolating a frame to a video according to embodiments of the disclosure (for example, the first obtaining module 710, the second obtaining module 720 and the generating module 730 as illustrated in FIG. 7). The processor 910 executes various functional applications and data processing of the server by running a non-transitory software program, an instruction, and a module stored in the memory 920, that is, a method for interpolating a frame to a video according to embodiments of the disclosure is implemented.

The memory 920 may include a program storage area and a data storage area. The program storage area may store operation systems and application programs required by at least one function. The data storage area may store data created based on the use of a positioning electronic device, etc. In addition, the memory 920 may include a high-speed random access memory, and may also include a non-transitory memory, such as at least one magnetic disk storage device, a flash memory device, or other non-transitory solid-state storage devices. In some embodiments, the memory 920 optionally includes a memory set remotely relative to the processor 910 that may be connected to a positioning electronic device via a network. The example of the above networks includes but not limited to an Internet, an enterprise intranet, a local area network, a mobile communication network and their combination.

An electronic device for implementing a method for interpolating a frame to a video may further include: an input apparatus 930 and an output apparatus 940. The processor 910, the memory 920, the input apparatus 930, and the output apparatus 940 may be connected through a bus or in other ways. FIG. 9 takes connection through a bus as an example.

The input apparatus 930 may receive input digital or character information, and generate key signal input related to user setting and function control of a positioning electronic device, such as a touch screen, a keypad, a mouse, a track pad, a touch pad, an indicating rod, one or more mouse buttons, a trackball, a joystick and other input apparatuses. The output apparatus 940 may include a display device, an auxiliary lighting apparatus (for example, a LED) and a tactile feedback apparatus (for example, a vibration motor), etc. The display device may include but not limited to a liquid crystal display (LCD), a light emitting diode (LED) display and a plasma display. In some implementations, a display device may be a touch screen.

Various implementation modes of the systems and technologies described herein may be implemented in a digital electronic circuit system, an integrated circuit system, a dedicated ASIC (application specific integrated circuit), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

The computer programs (also called as programs, software, software applications, or codes) include machine instructions of a programmable processor, and may be implemented with high-level procedure and/or object-oriented programming languages, and/or assembly/machine languages. As used herein, the terms "a machine-readable medium" and "a computer-readable medium" refer to any computer program product, device, and/or apparatus configured to provide machine instructions and/or data for a programmable processor (for example, a magnetic disk, an optical disk, a memory, a programmable logic device (PLD)), including a machine-readable medium that receive machine instructions as machine-readable signals. The term "a machine-readable signal" refers to any signal configured to provide machine instructions and/or data for a programmable processor.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

With the method for interpolating a frame to a video according to embodiments of the disclosure, the frame interpolation to video does not rely on explicit optical flow information based on manually labelling. By making full use of the optical flow information in the video, jitter, blurring and deformation of pictures of the video can be reduced, cost can be saved, time consumption can be shortened, the efficiency of the frame interpolation to video can be improved, and the effect of the frame interpolation to video can be enhanced. Further, after getting rid of the dependence on explicit optical flow information, defined optimization of different types of videos may be realized. Further, uniform supervision training is performed in a scenario of the frame interpolation to video to further improve the effect of the frame interpolation.

A computer program product is also provided in the disclosure. The computer program product includes a computer program. When the computer program is executed by a processor, a method for interpolating a frame to a video according to embodiments of the disclosure is executed.

It is to be understood that, various forms of procedures shown above may be configured to reorder, add or delete blocks. For example, blocks described in the disclosure may be executed in parallel, sequentially, or in a different order, as long as the desired result of the technical solution of the disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the spirit and principle of embodiments of the disclosure shall be included within the protection scope of embodiments of the disclosure.

What is claimed is:

1. A method for interpolating a frame to a video, comprising:
   obtaining a first deep-level feature of a first frame and a second deep-level feature of a second frame, the first frame and the second frame are adjacent frames of a video;
   obtaining forward optical flow information and inverse optical flow information between the first frame and the second frame based on the first deep-level feature and the second deep-level feature;
   generating an interpolated frame between the first frame and the second frame based on the forward optical flow information and the inverse optical flow information, and inserting the interpolated frame between the first frame and the second frame;
   wherein, obtaining the forward optical flow information and the inverse optical flow information comprises:
   obtaining the forward optical flow information by performing forward optical flow learning from the first frame to the second frame on the first deep-level feature and the second deep-level feature; and
   obtaining the inverse optical flow information by performing inverse optical flow learning from the second frame to the first frame on the first deep-level feature and the second deep-level feature; and
   wherein the method further comprises: generating a third deep-level feature by splicing the first deep-level feature and the second deep-level feature, the third deep-level feature being used for performing the forward optical flow learning and the inverse optical flow learning.

2. The method of claim 1, wherein generating the interpolated frame between the first frame and the second frame comprises:
   generating a fourth deep-level feature based on the forward optical flow information and the first deep-level feature;
   generating a fifth deep-level feature based on the inverse optical flow information and the second deep-level information; and
   generating a sixth deep-level feature by splicing the fourth deep-level feature and the fifth deep-level feature and generating the interpolated frame based on the sixth deep-level feature.

3. The method of claim 2, wherein generating the fourth deep-level feature comprises:
   generating the fourth deep-level feature by performing track mapping on feature information of the first deep-level feature based on the forward optical flow information.

4. The method of claim 2, wherein generating the fifth deep-level feature comprises:
   generating the fifth deep-level feature by performing track mapping on feature information of the second deep-level feature based on the inverse optical flow information.

5. An electronic device, comprising:
   at least one processor; and
   a memory, communicatively coupled to the at least one processor; wherein,
   the memory is configured to store instructions executable by the at least one processor, when the instructions are executed by the at least one processor, the at least one processor is configured to:
   obtain a first deep-level feature of a first frame and a second deep-level feature of a second frame, the first frame and the second frame are adjacent frames of a video;
   obtain forward optical flow information and inverse optical flow information between the first frame and the second frame based on the first deep-level feature and the second deep-level feature;
   generate an interpolated frame between the first frame and the second frame based on the forward optical flow information and the inverse optical flow information, and insert the interpolated frame between the first frame and the second frame;
   wherein the at least one processor is configured to obtain the forward optical flow information by performing forward optical flow learning from the first frame to the second frame on the first deep-level feature and the second deep-level feature; and obtain the inverse optical flow information by performing inverse optical flow learning from the second frame to the first frame on the first deep-level feature and the second deep-level feature; and
   wherein the at least one processor is further configured to: generate a third deep-level feature by splicing the first deep-level feature and the second deep-level feature, the third deep-level feature being used for performing the forward optical flow learning and the inverse optical flow learning.

6. The electronic device of claim 5, wherein the at least one processor is further configured to:
   generate a fourth deep-level feature based on the forward optical flow information and the first deep-level feature;
   generate a fifth deep-level feature based on the inverse optical flow information and the second deep-level information; and
   generate a sixth deep-level feature by splicing the fourth deep-level feature and the fifth deep-level feature and generate the interpolated frame based on the sixth deep-level feature.

7. The electronic device of claim 6, wherein the at least one processor is further configured to:
   generate the fourth deep-level feature by performing track mapping on feature information of the first deep-level feature based on the forward optical flow information.

8. The electronic device of claim 5, wherein the at least one processor is further configured to:
   generate the fifth deep-level feature by performing track mapping on feature information of the second deep-level feature based on the inverse optical flow information.

9. A non-transitory computer-readable storage medium, having computer instructions stored thereon, wherein the computer instructions are configured to cause a computer to execute a method for interpolating a frame to a video, the method comprising:
   obtaining a first deep-level feature of a first frame and a second deep-level feature of a second frame, the first frame and the second frame are adjacent frames of a video;
   obtaining forward optical flow information and inverse optical flow information between the first frame and the second frame based on the first deep-level feature and the second deep-level feature;
   generating an interpolated frame between the first frame and the second frame based on the forward optical flow information and the inverse optical flow information, and inserting the interpolated frame between the first frame and the second frame;

wherein, obtaining the forward optical flow information and the inverse optical flow information comprises:

obtaining the forward optical flow information by performing forward optical flow learning from the first frame to the second frame on the first deep-level feature and the second deep-level feature; and obtaining the inverse optical flow information by performing inverse optical flow learning from the second frame to the first frame on the first deep-level feature and the second deep-level feature; and wherein the method further comprises: generating a third deep-level feature by splicing the first deep-level feature and the second deep-level feature, the third deep-level feature being used for performing the forward optical flow learning and the inverse optical flow learning.

10. The non-transitory computer-readable storage medium of claim 9, wherein generating the interpolated frame between the first frame and the second frame comprises:

generating a fourth deep-level feature based on the forward optical flow information and the first deep-level feature;

generating a fifth deep-level feature based on the inverse optical flow information and the second deep-level information; and generating a sixth deep-level feature by splicing the fourth deep-level feature and the fifth deep-level feature and generating the interpolated frame based on the sixth deep-level feature.

11. The non-transitory computer-readable storage medium of claim 10, wherein generating the fourth deep-level feature comprises:

generating the fourth deep-level feature by performing track mapping on feature information of the first deep-level feature based on the forward optical flow information.

12. The non-transitory computer-readable storage medium of claim 10, wherein generating the fifth deep-level feature comprises:

generating the fifth deep-level feature by performing track mapping on feature information of the second deep-level feature based on the inverse optical flow information.

* * * * *